(No Model.) 8 Sheets—Sheet 1.

W. SELLERS, H. B. BRADFORD & B. D. COPPAGE.
WATER TUBE BOILER.

No. 588,839. Patented Aug. 24, 1897.

Fig. 1

WITNESSES—
Thomas Jaquett
Oscar M. Weldie

INVENTORS—
Wm Sellers
H B Bradford
B. Denver Coppage (No Model.) 8 Sheets—Sheet 2.
W. SELLERS, H. B. BRADFORD & B. D. COPPAGE.
WATER TUBE BOILER.

No. 588,839. Patented Aug. 24, 1897.

(No Model.)  8 Sheets—Sheet 3.

W. SELLERS, H. B. BRADFORD & B. D. COPPAGE.
WATER TUBE BOILER.

No. 588,839.  Patented Aug. 24, 1897.

(No Model.) 8 Sheets—Sheet 4.
W. SELLERS, H. B. BRADFORD & B. D. COPPAGE.
WATER TUBE BOILER.

No. 588,839. Patented Aug. 24, 1897.

(No Model.) 8 Sheets—Sheet 7.

W. SELLERS, H. B. BRADFORD & B. D. COPPAGE.
WATER TUBE BOILER.

No. 588,839. Patented Aug. 24, 1897.

Witnesses —
Thomas Jaquett
Oscar M. Weldie

Inventors —
Wm Sellers
H. B. Bradford
B. Denver Coppage (No Model.) 8 Sheets—Sheet 8.
W. SELLERS, H. B. BRADFORD & B. D. COPPAGE.
WATER TUBE BOILER.

No. 588,839. Patented Aug. 24, 1897.

WITNESSES —
Thomas Jaquett
Oscar M. Weldie

INVENTORS —
Wm Sellers
H. B. Bradford
B. Denver Coppage

UNITED STATES PATENT OFFICE.

WILLIAM SELLERS, OF PHILADELPHIA, PENNSYLVANIA, AND HENRY B. BRADFORD AND BENJAMIN DENVER COPPAGE, OF WILMINGTON, DELAWARE, ASSIGNORS TO THE EDGE MOOR IRON COMPANY, OF EDGE MOOR, DELAWARE.

WATER-TUBE BOILER.

SPECIFICATION forming part of Letters Patent No. 588,839, dated August 24, 1897.

Application filed January 9, 1897. Serial No. 618,621. (No model.)

*To all whom it may concern:*

Be it known that we, WILLIAM SELLERS, of the city and county of Philadelphia, in the State of Pennsylvania, and HENRY BANNING BRADFORD and BENJAMIN DENVER COPPAGE, of the city of Wilmington, county of New Castle, in the State of Delaware, have invented certain Improvements in Water-Tube Boilers, of which improvements the following is a specification.

Our invention relates to that class of boilers in which water within tubes is exposed to heat, which produces a circulation of the water through the tubes and the generation of steam, which separates from the water as it reaches a suitable receptacle or receptacles above it. There is a great variety of these boilers, but a feature common to all is a lower receptacle for water connected to an upper reservoir by tubes inclined or perpendicular to the horizon, which reservoir is only partially filled with water, so as to permit an escape of steam above the level of the water therein. The means by which the tubes are connected to the lower receptacle for water and to the reservoir are various, but usually each end of the tubes is expanded into a header at right angles to the tube, the upper ends of the headers being connected to the under sides of a cylindrical reservoir or reservoirs which extend above and beyond the headers, so that the water from the upper ends of the tubes may pass through the header at that end, to and through the reservoir, to the header which reaches to the lower receptacle for water, whereby a continuous circulation of the water is maintained which parts with its steam as it passes through the reservoir. In all such boilers provision must be made for cleaning the interior of the tubes and for replacing a worn or defective one, for which purpose one end of the tube is expanded into a hole in one side of the header, and it is cleansed or removed through a corresponding hole in the opposite side of the same header, and a like arrangement is made at the opposite header. These cleansing-holes in the headers must all be closed to resist the steam-pressure, and usually this is effected by bolting a cap properly packed over each hole, in which case the bolts sustain the steam-pressure. It would be better to place the cap inside the header to avoid danger from a breaking bolt, so that the steam-pressure would tend to tighten the packing; but as heretofore constructed the holes to be covered are round, or, if oval, the header-plate must be much thicker to leave sufficient metal in the side of the header to sustain the pressure, so that the practice is almost universal to bolt the cap on the outside of the header and against the steam-pressure.

In a large proportion of water-tube boilers the products of combustion pass over the tubes transversely—that is to say, at right angles to their axes—and are so directed by division-walls built between the tubes as they are inserted in the headers. In perhaps a larger proportion of such boilers the products of combustion are directed longitudinally of the tubes by diaphragms which are supported upon a row of tubes the upper surfaces of which are in a plane. These walls and diaphragms from their construction can neither be removed nor replaced without partially removing the side walls of the boiler, and those for directing the traverse of these products transversely must be practically at right angles to the tubes, although this makes an improper division of the spacing, that one over the grates being much too large.

It is one object of our invention, therefore, without increasing the thickness of the header-plates, to provide a hand-hole for each tube which shall have a cover inside the header, removable through the hole which it covers, so that the pressure shall tend to tighten the packing, and another is to provide means for building and maintaining the cross-walls and diaphragms without obstruction from the side walls and the cross-walls at any desired inclination to the axes of the tubes.

To these ends our invention consists in oblong or oval flanged hand-holes in the outside plate of a header opposite each tube in the inside plate of the same header.

It further consists in a deflecting-wall in sections for directing the products of combustion transversely to the tubes, each section having a width not less than half the distance from center to center of the lines of tubes between which it is to be inserted, provided with flanges which conform to the shape of the tubes and at such angle with the wall as will fix it at the desired inclination to the tubes.

It further consists in a series of diaphragms adjacent to each other, each of which is divided longitudinally and supported by three tubes; and it further consists in certain details of construction set forth in the following description in connection with the drawings which form a part of this specification.

Fig. 8 is a front elevation of a portion of one side of a header. Fig. $8^a$ shows the upper corner of same, and Fig. $8^b$ shows the lower corner of same. Figs. 9, $9^a$, and $9^b$ are side views of the same. Fig. 10 is a plan of the part shown in Fig. $8^a$. Fig. 11 is a side view of the lower end of the back header, showing the expansion-rollers. Fig. 12 is a front elevation of parts of the deflecting-walls across the heating-pipes. Fig. 13 is a side view, and Fig. 14 an end view, of the same. Fig. 15 shows the fire-brick of the front deflecting-wall in elevation, and Fig. 16 a side view of same. Fig. 17 is a front elevation of a portion of a header, showing its oval hand-holes. Fig. 18 is a section of the same on the line $f\,g$. Fig. 19 is a section of the same on the line $g\,h$. Fig. 20 is a section of the same on the line $h\,i$.

Figure 3:
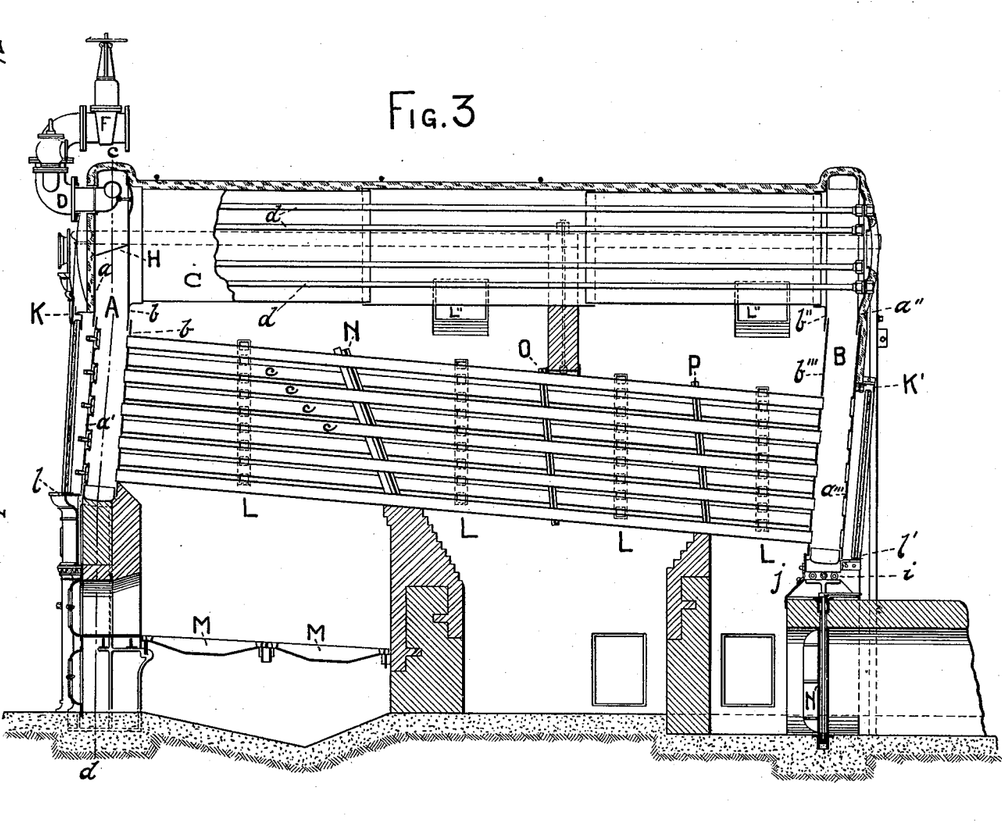
Fig. 3 is a vertical longitudinal section of the boiler on the line $b\,c$, Fig. 4.
Figure 4:
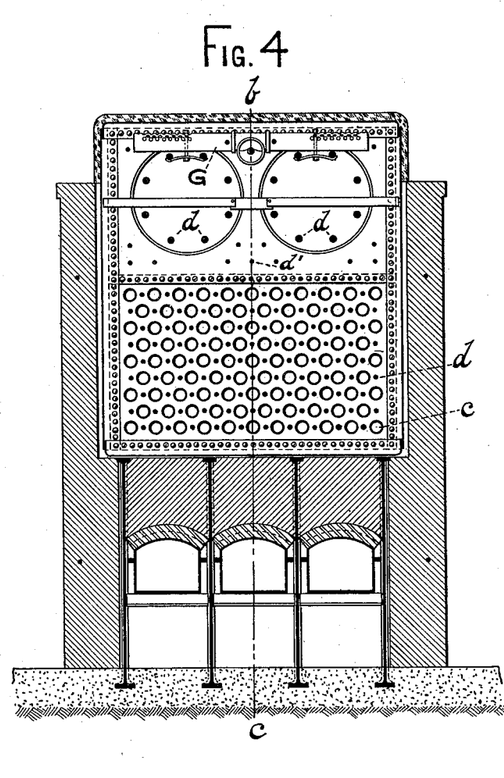
Fig. 4 is a vertical cross-section on the line $c\,d$, Fig. 3, showing the interior of the front header with the dry-pipe across the upper portion thereof.
Figure 6:
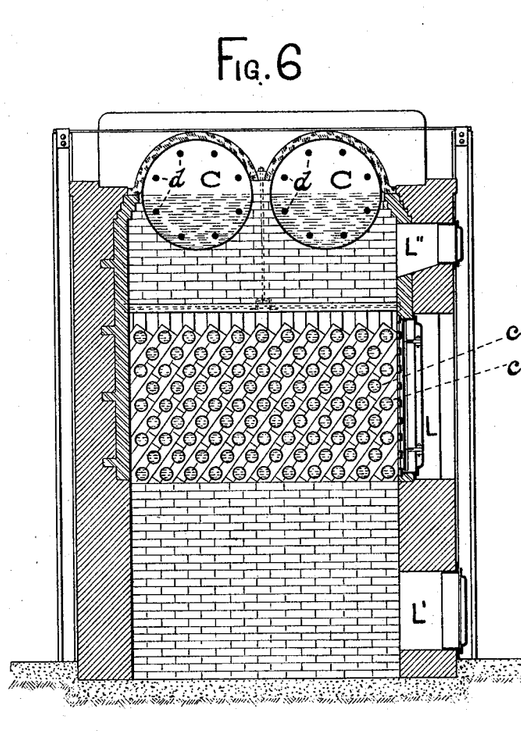
Fig. 6 is a vertical cross-section of the boiler on the line $e\,f$, Fig. 1.
Figure 7:
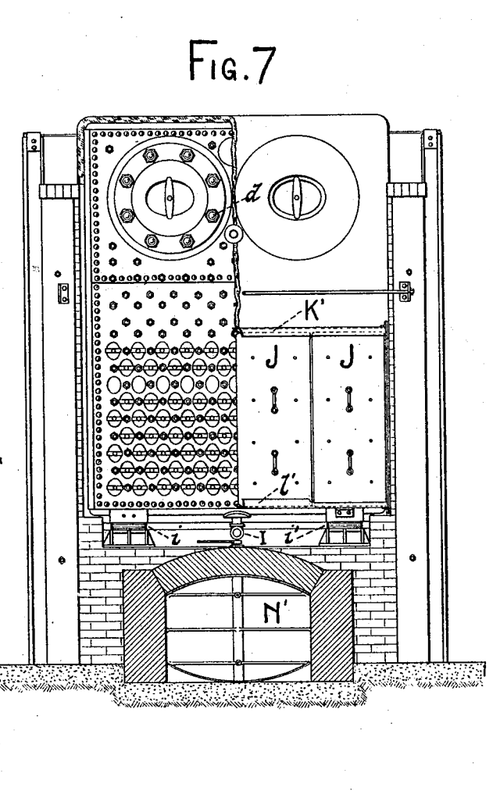
Fig. 7 is a rear end elevation of the boiler with the movable non-conductor covering removed from one-half of the boiler and with the flue in cross-section.
Figure 21:
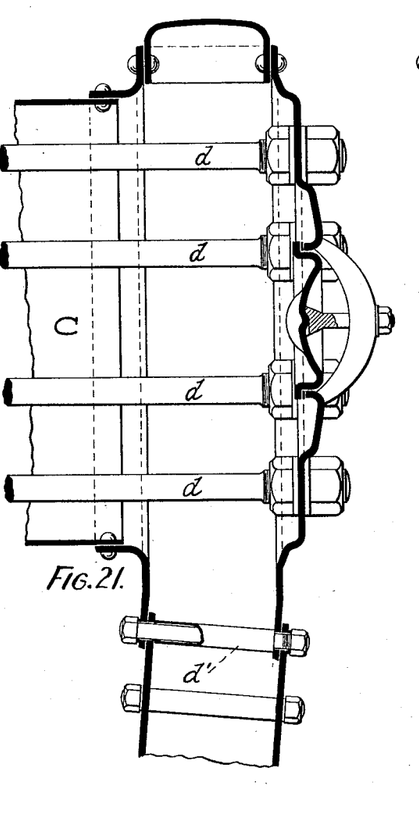
Fig. 21 shows in section the outer header-plate of the rear header opposite the cylindrical drums which form part of the reservoir.
Figure 22:
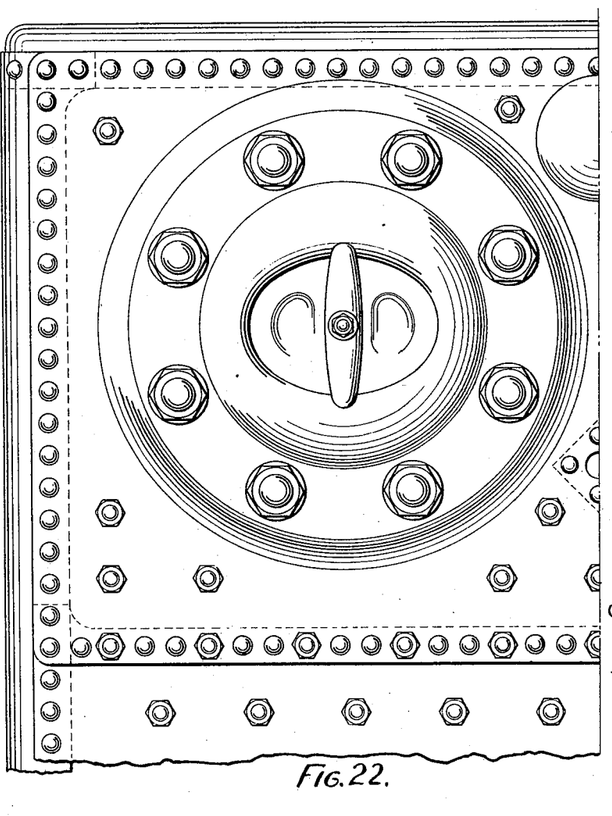
Fig. 22 shows an elevation of the same.

The headers of our boiler are rectangular boxes, (shown in section in Fig. 3,) the front header A having less depth than the back header B, the two being united by the reservoir C, which in this instance is composed of two horizontal cylindrical drums C and C', (shown in Fig. 6,) and by the tubes $c\,c\,c\,c$, which, with reference to the cylindrical drums, are lower at the back than at the front end. To facilitate this construction, the upper parts of the headers are perpendicular to the axis of the drums and the lower parts are perpendicular to the axis of the tubes. The upper and the lower parts of the headers must therefore form an angle with each other. The covering-plates $a$ and $a'$, $a''$ and $a'''$, $b$ and $b'$, $b''$ and $b'''$ of each header are united near this angle by a row of rivets and stay-bolts, as shown in Figs. 4 and 7. The inner plates $b$ and $b''$ are flanged to receive the ends of the drums C and C', to which they are united by rivets, as shown in Fig. 3, and the ends of the water-tubes $c\,c\,c\,c$ are expanded into the holes provided for them in the plates $b'$ and $b'''$. The outer plates $a$ and $a''$, which close the ends of the reservoir, are bulged outward opposite each drum and provided with a flat surface around each bulge to form a seat for the nuts and washers of the stay-rods $d\,d\,d$, which surface is raised above the surface of the header-plate to stiffen this plate and extend the area of the stayed surface beyond that portion of the front plates opposite the drums. (See Figs. 21 and 22.) The pressure upon other parts of the plates is sustained by the stay-bolts $d'\,d'$. (Shown in Fig. 4 and upon an enlarged scale in Figs. 17, 18, and 19.) The sides or edges of the headers are formed by the flanged troughs shown in Figs. 4, 7, 8, $8^a$, 9, $9^a$, $9^b$, and 10. The upper and the lower troughs are straight and preferably have closed ends, as shown in Figs. $8^a$ and 10, while the vertical troughs which form the sides have open ends which overlap the closed ends of the top and the bottom troughs, as shown in Figs. $8^a$ and 10, and are bent to the angle which the tubes make with the drums, but all of these troughs may have one end closed and the other end open, as shown in Fig. $8^a$. These troughs have parallel sides except near the closed ends, where the sides gradually approach each other, so that where the open-end trough which overlaps this end is scarfed at the overlap the outer surface will be in the same plane as the parallel sides of the trough, so that the covering-plate can be riveted thereon without bending it, as shown in Fig. 10.

Figures 8, 8A, 8B, 9, 9A, 10, 11, 12, 13, 15, 16, 17, 18, 19, 20:
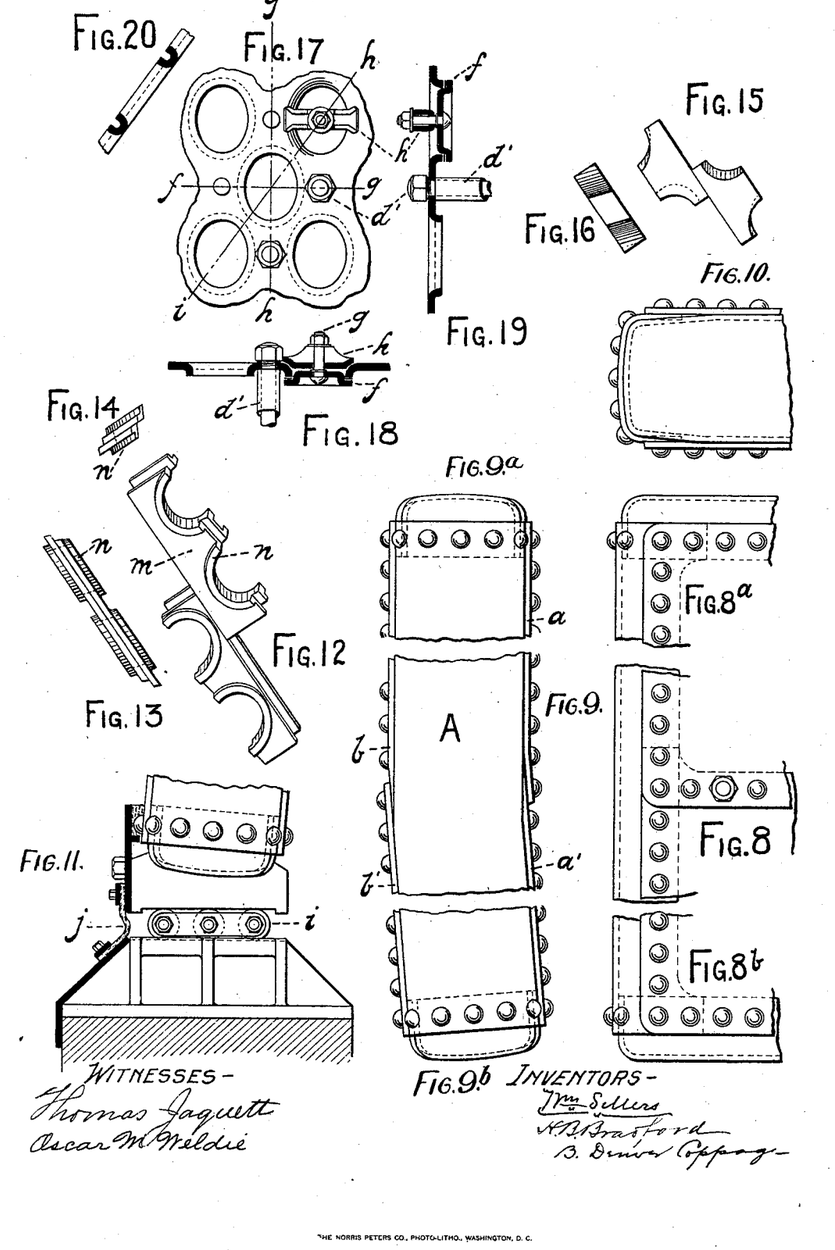

The covering-plates $a$ and $a'$, $a''$ and $a'''$, $b$ and $b'$, $b''$ and $b'''$ are preferably united by rivets to each other and to the vertical troughs near the bend in these troughs, and the under sheets at this joint are scarfed, so that only one of the overlapping sheets requires to be bent, whereby the surfaces for the nuts of stay-bolts $d'\,d'$ become parallel, as shown in Fig. 9.

Figure 5:
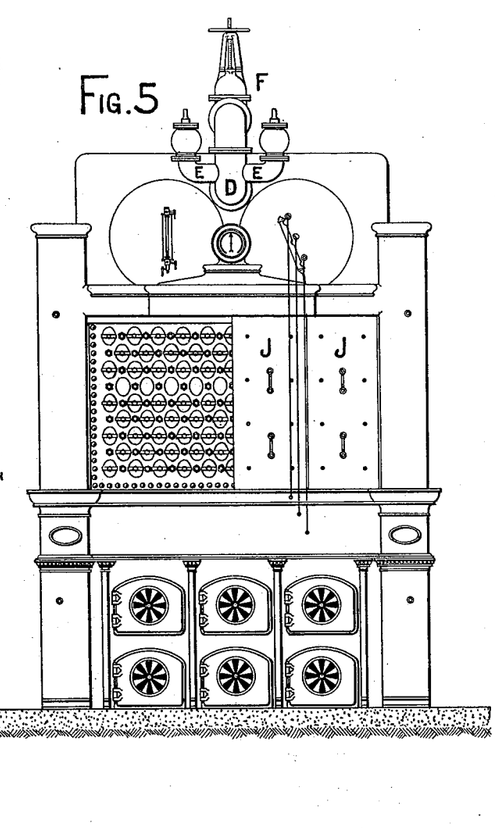
Fig. 5 is a front end elevation of the boiler, showing the movable non-conductor covering removed over one-half of the hand-hole covers.

The outer lower plates $a'$ and $a'''$ of the headers are provided with oblong or oval flanged hand-holes, as shown in Figs. 3, 5, and 7 and upon an enlarged scale in Figs. 17, 18, 19, and 20. These hand-holes are opposite the ends of the tubes, as shown in Fig. 3, and their long diameter is vertical, as shown in Figs. 5, 7, and 17. These hand-holes serve for inserting and expanding the tubes in the first instance, also for removing a tube damaged in service and for inserting another in its place. They also serve for cleansing the interior of the tubes, for all of which purposes they are especially convenient, as the oblong or oval hole enables the cover to be placed inside the header, and, being flanged, the end of the flange can be dressed true to form a perfect seat for the cover, which the pressure maintains upon its seat, and from whence any one can be withdrawn without disturbing the others. The flanges for these oval holes must be formed in dies, and the flanges afford the necessary strength for the plate not otherwise attainable without a great increase in the thickness of this plate where the holes are so close together. For the purpose of flanging, the plates should be heated to a red heat, which expands the material, so that the distance from center to center of holes is much greater than when it is cold. Therefore the spacing of the dies for flanging must be proportioned accordingly, and as the metal cools rapidly when in contact with the dies the time in which the operation must be performed is limited, so that conveniences for handling and for removing the plate from the dies must be provided. After all the oval holes have been flanged the end of the flange for each hole is dressed to a true plane to afford a suitable surface upon which to compress the packing. The covers for these oval holes, as well as the mode of fastening them to the plate, are shown in Figs. 18 and 19. Fig. 18 shows a section of one of these covers $f$ at its short diameter and Fig. 19 a section of the same cover at its long diameter, the raised portion in which the bolt $g$ is placed affording a shoulder for the packing. This bolt $g$ passes through the bar $h$, which extends across the short diameter of the oval hole, as shown in Fig. 17, and is fitted upon the rounded edge of the flanged hole, as shown in Fig. 18, so that by tightening the nut upon the bolt $g$ the cover will be forced against the packing between the end of the flange and the oval cover-plate, as shown in the same figures. The position of the stay-bolts $d'$ $d'$ with reference to the oval holes, as well as the mode of attachment, is shown in Figs. 4, 5, 7, 17, 18, and 19, from which it will be seen that access to every stay-bolt may be had through the oval holes or from the horizontal cylindrical drums C and C', so that these bolts may be tightened if they leak, or they may be removed if defective and replaced by others.

Figure 1:
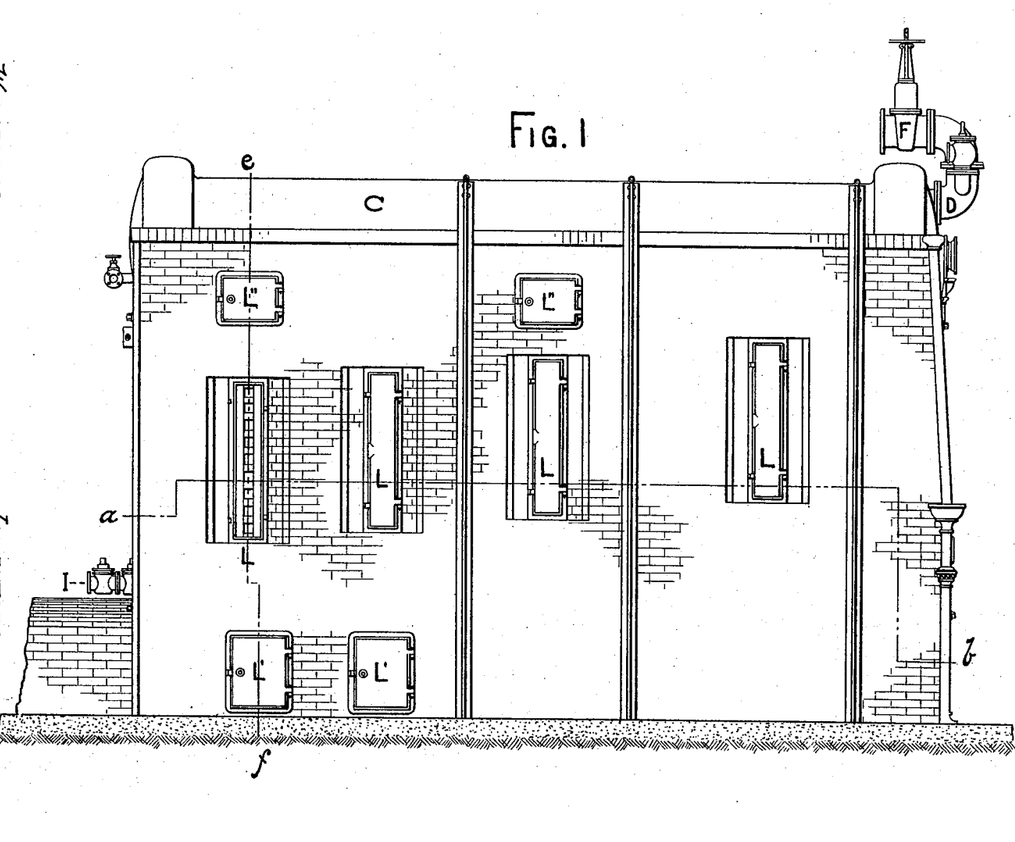
Figure 1 of the drawings exhibits a side elevation of the brickwork of the boiler, showing its cleaning-doors and stay-braces, with a portion of the steam and water reservoir above the brickwork.
Figure 2:
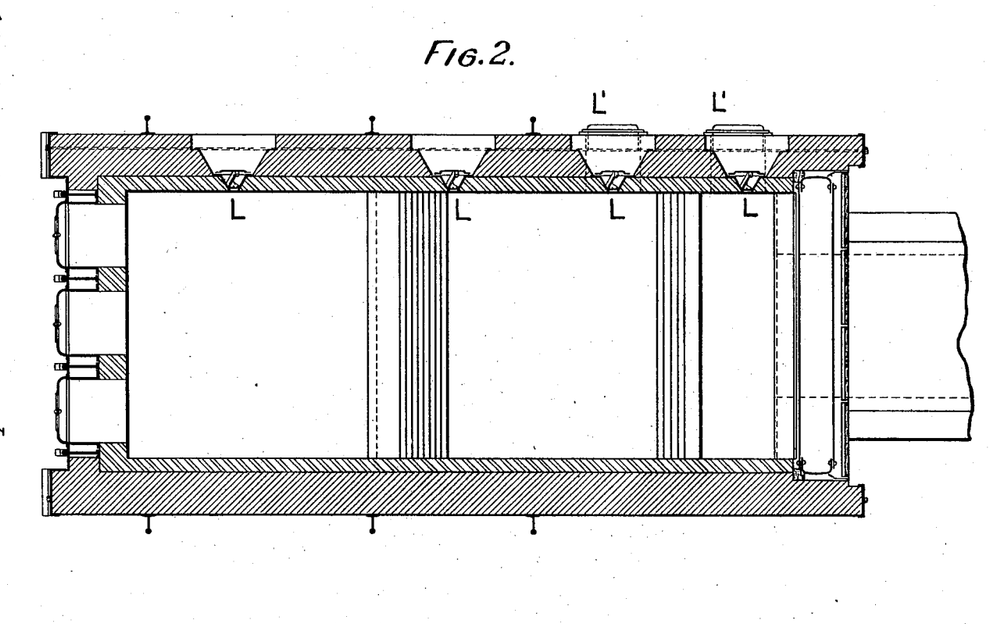
Fig. 2 is a cross-section of Fig. 1 on the line $a\,b$.

The steam-pipe through which the steam is delivered may be attached to either header or to either or to both of the horizontal cylindrical drums, as most convenient. In the present instance we have shown it on the front header A in elevation in Fig. 5, where D is the main steam-pipe, provided with side outlets E E', on each of which is mounted a safety-valve, the main pipe extending between and beyond these side outlets to the main stop-valve F. This main pipe D is firmly attached to the front plate of the header by a suitable flange formed on the front plate $a$ of this header, to which, on the interior of the header, is attached the dry-pipe G, as shown in Fig. 4. This dry-pipe is closed at the ends and extends across the boiler a sufficient distance to distribute the delivery of the steam equally along the upper interior of the header to the interior of the pipe through small holes along its upper side, to which the steam from all parts of any size of this boiler has free access, through much larger openings than heretofore attainable in water-tube boilers. Below the water-line in the front header A we provide a deflecting-plate H, Fig. 3, which extends across the width of this header, so as to deflect the rising current of water into the horizontal cylindrical drums C and C', in which case the area for the delivery of the rising current is much greater than heretofore attainable. Consequently the inflow to the reservoir is less rapid, while the direction of the current as it enters the cylindrical drums is that which it maintains in passing through them. There is therefore less disturbance and the water-level is notably more uniform. The front header A is fixed upon the iron framing of the furnace, (shown in Fig. 3,) while the back header B is supported upon two sets of rollers $i$ $i'$, (shown in Figs. 3, 7, and 11,) and between these two sets of rollers is placed the blow-off valve I. (Shown in Figs. 1 and 7.) The opening under the back header B is closed by a sheet of asbestos cloth $j$ or other refractory material, as shown in Figs. 3 and 11. One edge of the cloth is clamped to the header and the other to the plate which supports the two sets of rollers $i$ $i'$, while the openings between this header and the side walls of the boiler are packed with similar material, as shown in Fig. 2. The ironwork of the boiler exposed to the air and to which access is not required is covered with non-conducting and preferably plastic material, which on the headers A and B extends downward to the cross-bars K and K'. These bars are firmly secured to their respective headers, and their outer edges are provided with downward-projecting flanges, which, in conjunction with the similar bars $l$ and $l'$, the outer edges of which project upward, as shown in Figs. 3 and 7, support the movable non-conducting cover-plates J J, Figs. 3, 5, and 7. The upward-projecting flanges of the bars $l$ and $l'$ are cut away partially, where most convenient, for a width equal to the width of the cover-plates J J, so that a cover-plate may be raised and pulled outward at the bottom to remove it from the cross-bars K and K', *l* and *l'*. When any one of these cover-plates has been removed from its supports, the remaining ones may be moved sidewise so as to uncover any portion of the header without removing the remaining covers from their supporting-bars.

The cover-plates J J are formed of two sheet-iron plates flanged at their edges, so that when the flanged sides are opposite each one can be slipped into the other, leaving a space between the plates equal to the depth of the flanges. This space is then filled with non-conducting material, and the plates are then secured together by a tinner's joint at the flanges and by rivets or small bolts, which pass through the non-conducting material and are secured upon the outer surfaces of the plates J J. When the products of combustion traverse the tubes *c c*, as shown in Fig. 3, they are directed in the proper course by the cross-walls N O P. These walls are built up of castings (shown in Figs. 12, 13, and 14) formed of a plate *m*, the edges of which are cut out to fit the tubes, and around the edge of each cut is raised a flange *n*, also fitting the tube, so that the two flanges *n n* and the thickness of the plate *m* form a broad surface which fits upon the surface of the tube, the length of which surface must not exceed the distance between the rows of tubes, as shown in Fig. 6, the lines on which show the position these castings assume with reference to the spaces between the tubes. The edges and ends of the plate *m* are stepped, as shown, so that when any two castings are brought together, as shown in Fig. 12, they will overlap each other to form a more perfect obstruction to the passage of the products of combustion between them. The width of the plate *m* must be such that it will occupy one-half the distance from center to center of the lines of tubes, between which these plates are inserted, as shown in Fig. 12. As thus constructed a plate *m* may be inserted between the lines of tubes by first turning it at right angles to the position it is to take when in place, then passing it between the tubes in the lines shown in Fig. 6 until it has reached the desired position vertically, and then turning it until the flanged edges of the plate *m* will fit over the tubes in the position along the tube it is destined to occupy. A second plate *m* may then be inserted as before, and after it has been lodged upon the tubes it is moved along the tubes until the two plates come together, as shown in Fig. 12, and so on until the deflecting-wall is completed. It will be noted that the cross-wall N is at a different angle to the lines of pipe from those of O and P. This is determined by the construction of the pattern, which by fixing the surface of the castings which rest upon the pipes determines in advance the angle of inclination of the deflecting-wall. As the front wall N is exposed to much greater heat than either O or P, we protect it by fire-brick lining. (Shown in Fig. 3 and in detail in Figs. 15 and 16.) These fire-bricks are constructed under the same rules as govern the castings above described; but to avoid difficulty with such friable material as fire-brick we do not have the fire-bricks overlap each other, and for the same reason each brick preferably takes vertical support from but one tube. These bricks are inserted between the lines of tubes in the same manner as that above described for the castings, and when in place against the deflecting-wall of castings the fire-brick wall receives lateral support from the castings in addition to the vertical support afforded by the tubes.

The fire-brick and the castings may be varied in length so that each piece may extend over one or over all of the tubes or any proportion thereof, as may be found most convenient, but whatever the number of tubes to be covered by a single casting or by a brick these parts of the deflecting-wall must be arranged so that they may be inserted and secured in place as above described.

When the products of combustion are to be directed over the water-tubes longitudinally, we insert a diaphragm parallel with the tubes near to or resting upon the lower row of tubes and extending from the front header to within such distance of the rear header as will permit a free passage for the products of combustion between this end of the diaphragm and the rear header. Near to or on the upper row of tubes we place another diaphragm extending from the rear header to within such distance of the front header as will permit a free passage for the products of combustion between this end of the diaphragm and the front header. The diaphragms are composed of refractory material, preferably fire-brick, and their construction is shown in Figs. 23, 24, and 25.

Figures 23, 24, 25, 26:
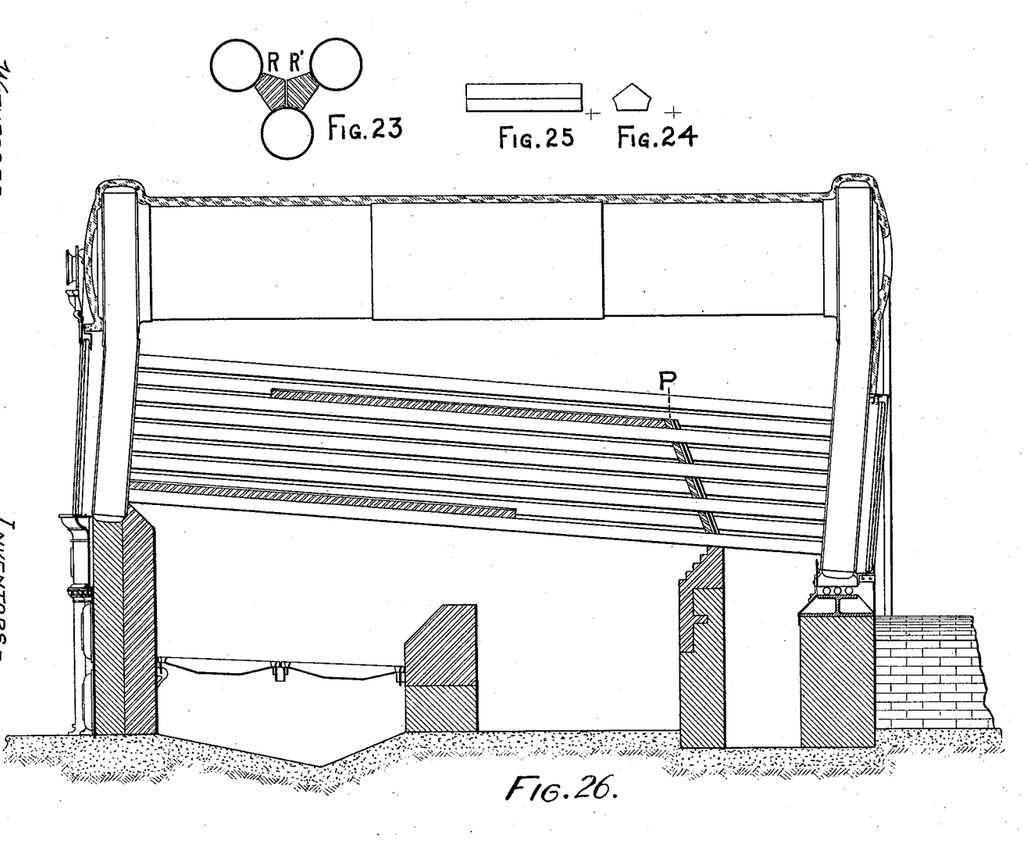
Fig. 23 is a cross-section of three of the water-tubes, showing a cross-section of the diaphragm supported by these tubes.
Fig. 24 is an end view of a tile which makes half the diaphragm in the length of this tile.
Fig. 25 is a side elevation of the same.
Fig. 26 represents a side elevation of the boiler with a side wall of the boiler-chamber removed.

The diaphragm R R' is shown in Fig. 23 located centrally between three of the water-tubes, and receives support from all of these tubes. It is composed of two triangular-shaped fire-bricks, and an end view of one is shown in Fig. 24 and a side elevation in Fig. 25. The vertical height of these bricks from the base to the obtuse angle in the center is less than the width of the shortest space between the water-tubes, so that these bricks can be passed from below or above these tubes through these spaces on the lines shown on Fig. 6 to the location desired. The first one may then be turned parallel to the tubes and slid longitudinally to its proper place. The second may be in the same way passed to the rear of the first and be then slid longitudinally alongside of the first, and so on until the diaphragm is complete, or the whole series of diaphragms to extend across the boiler-chamber may at the same time and in like manner be built up or changed at will without in any manner interfering with the side walls which inclose the boiler-chamber. When the upper diaphragm of this construction is extended to the back header, the products of combustion must pass to the chimney above this diaphragm, but as it is frequently more desirable to make the pass to the chimney below the boiler a combination of the cross-wall P with the longitudinal diaphragm R R' will accomplish the purpose. This arrangement is illustrated in Fig. 26, which represents a side elevation of the boiler with a side wall of the boiler-chamber removed. The lower diaphragm starts at the front header and extends along the tubes to within such distance of the cross-wall P as will permit a free passage for the products of combustion between this end of the diaphragm and the cross-wall. The upper diaphragm starts at the cross-wall P and extends along the tubes to within such distance of the front header as will permit a free passage for the products of combustion between this end of the diaphragm and the front header.

The ironwork of the boiler, by reason of the construction described, is self-supporting, the headers make front and back walls, and with a brick wall on each side the whole forms a fire-chamber in which the water inclosed in the boiler is subjected to heat from the fuel which rests upon the grate-bars M M, Fig. 3. The water-tubes $c\ c\ c\ c$ are far enough apart vertically to permit the introduction of a steam-jet pipe between them, and doors L L L L, Figs. 1 and 2, are provided in either of the two side walls, through which this pipe may be inserted and moved between the water-tubes, so that the steam issuing through a suitable aperture in the end of the steam-jet pipe may blow the ashes away which are deposited on the upper side of the water-tubes while the boiler is in use. To facilitate the use of this jet-pipe, the side casings for the doors L L L are inclined toward each other as they extend through the wall, and at the inside the two side casings are united by bars with spaces between corresponding to the vertical spaces between the tubes $c\ c\ c\ c$, as shown on Fig. 6, and through the spaces between these bars the jet-pipe may be conveniently inserted. Suitable doors L' L' are provided in the side walls to provide access to the chambers below the water-tubes at the rear end of the boiler and L'' L'' above the water-tubes. The outlet for the products of combustion is in this instance under the back header and is controlled by a damper N', as shown in Figs. 3 and 7.

When a longitudinal diaphragm is used, the ashes may be blown therefrom by a steam-jet pipe passed through the front and back headers, for which purpose the stay-bolts are made hollow. With this arrangement any number of boilers may be placed side by side in a continuous line, and access to the under side of the tubes may be had through the ash-pit by removing some of the grate-bars and to the upper side of the tubes by a removable section at the top of the side wall.

Having thus described our improvements in water-tube boilers, what we claim as new, and desire to secure by Letters Patent, is—

1. In a water-tube boiler, a rectangular header which closes one end of the reservoir for water and steam, in combination with a dry-pipe across the boiler and along the upper interior of the header.

2. In a water-tube boiler, a rectangular header provided with round holes on one side which receive and secure one end of each water-tube and on the opposite side of same header, a hole flanged inward opposite each of the round holes, in combination with inside covers for the flanged holes, which are removable through the flanged holes they cover.

3. In a water-tube boiler, a trough with a closed end and parallel sides which gradually approach each other near the closed end, to form one side of a header, in combination with a parallel trough having an open end which overlaps the closed end of the first trough to form an adjoining side of the header.

4. In a water-tube boiler, a rectangular header, provided with a spherical projection opposite the reservoir, which is surrounded by a lower flat annular surface above the surrounding surface of the header, in combination with stay-rods attached to the flat annular surface.

5. In a water-tube boiler, a series of tubes through which water circulates, and transversely thereto a deflecting-wall in sections, of a thickness that will pass the narrowest inclined row of spaces between the tubes, and of a width not less than half the horizontal distance from center to center of the tubes, in combination with a notched edge to each section, that will fit the outer surface of the tubes and determine the angle of the section thereto.

6. In a water-tube boiler, a series of tubes through which water circulates, in combination with a series of diaphragms parallel to the tubes and adjacent to each other, each of which is divided longitudinally and supported by three of the tubes.

7. In a water-tube boiler, a series of tubes through which water circulates, and the transverse deflecting-wall P, in combination with a series of diaphragms R R' substantially as described.

WM. SELLERS.
H. B. BRADFORD.
B. DENVER COPPAGE.

Witnesses:
THOMAS R. LALLY,
THOMAS JAQUETT.